United States Patent [19]
Hill

[11] Patent Number: 5,713,016
[45] Date of Patent: Jan. 27, 1998

[54] PROCESS AND SYSTEM FOR DETERMINING RELEVANCE

[75] Inventor: Joe R. Hill, Austin, Tex.

[73] Assignee: Electronic Data Systems Corporation, Plano, Tex.

[21] Appl. No.: 523,233

[22] Filed: Sep. 5, 1995

[51] Int. Cl.$^6$ .................................................. G06F 17/30
[52] U.S. Cl. ............................................ 395/605; 395/606
[58] Field of Search ................ 382/38, 15; 364/419.19; 395/605, 606

[56] References Cited

U.S. PATENT DOCUMENTS

| | | | |
|---|---|---|---|
| 5,140,692 | 8/1992 | Morita | 395/600 |
| 5,162,992 | 11/1992 | Williams | 364/419 |
| 5,168,565 | 12/1992 | Morita | 395/600 |
| 5,274,714 | 12/1993 | Hutcheson et al. | 382/15 |
| 5,297,042 | 3/1994 | Morita | 364/419.19 |
| 5,301,109 | 4/1994 | Landauer et al. | 364/419.19 |
| 5,317,507 | 5/1994 | Gallant | 364/419.13 |
| 5,325,298 | 6/1994 | Gallant | 364/419.19 |
| 5,325,445 | 6/1994 | Hebert | 382/38 |

OTHER PUBLICATIONS

Hill, Joe R. and Tsai, Chih-Ling, Calculating the Efficiency of Maximum Quasilikelihood Estimation. Appl. Stat. vol. 37, No. 2, 1988.

van Rijsbergen, C.J., Information Retrieval, Depart. of Computer Science, University College, Dublin, 1975.

Fuhr, Norbert and Chris Buckley, A Probabilistic Learning Approach for Document Indexing, ACM Transactions on Information Systems, vol. 9, No. 3, Jul. 1991, pp. 223–248.

Turtle, Howard and W. Bruce Croft, Evaluation of an Interference Network–Based REtrieval Model, ACM Transactions on Information Systems, vol. 9, No. 3, Jul. 1991, pp. 187–222.

*Primary Examiner*—Thomas G. Black
*Assistant Examiner*—Frantz Coby
*Attorney, Agent, or Firm*—L. Joy Griebenow; Anthony E. Peterman

[57] ABSTRACT

A process is provided for determining relevance using an electronic system. The process includes providing a first feature vector, providing a second feature vector, and providing an indexing parameter. A parametric family of sampling distributions are provided for the first feature vector using the indexing parameter. A parametric family of sampling distributions are also provided for the second feature vector using the indexing parameter. The process further includes providing a prior distribution of the indexing parameter. A distribution of the indexing parameter, given the second feature vector and an event that the first feature vector is not relevant to the second feature vector, is assigned the value of the prior distribution of the indexing parameter. A distribution of the indexing parameter, given the second feature vector and an event that the first feature vector is relevant to the second feature vector, is assigned the value of the posterior distribution of the indexing parameter given the second feature vector. A log likelihood ratio that the first feature vector is relevant to the second feature vector is then generated using the two assigned distributions of the indexing parameter. The log likelihood ratio is stored as representing relevance between the first feature vector and the second feature vector.

22 Claims, 10 Drawing Sheets

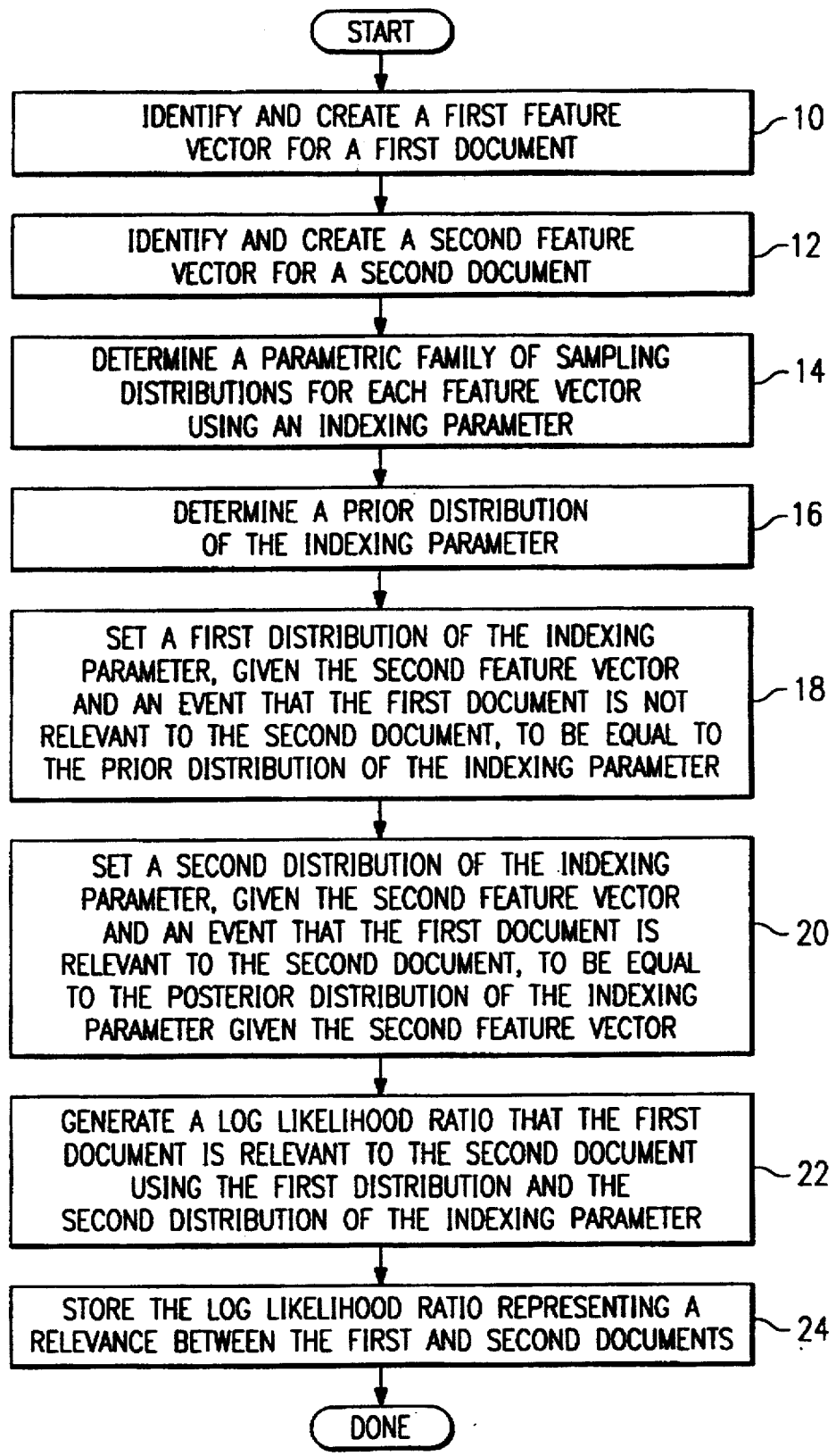

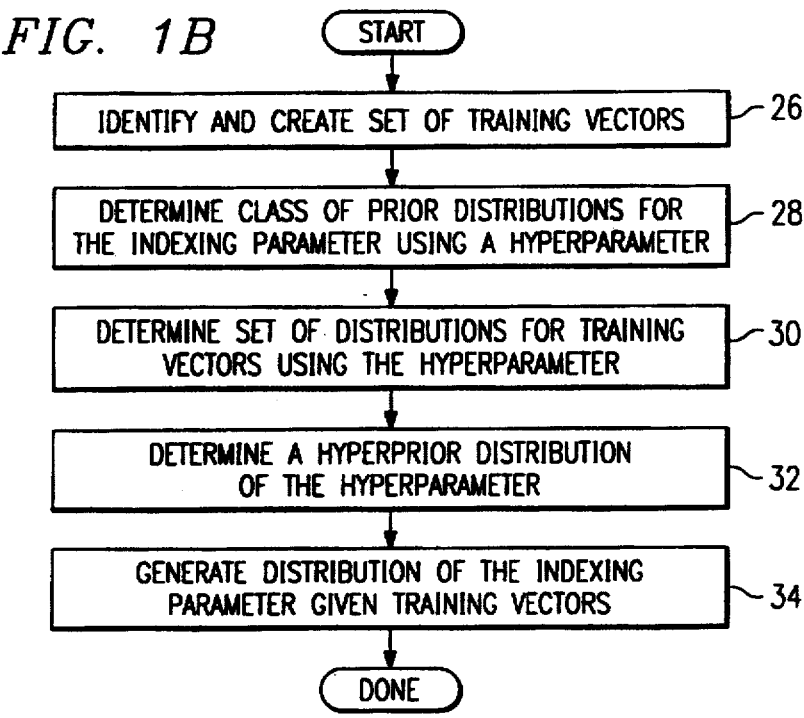
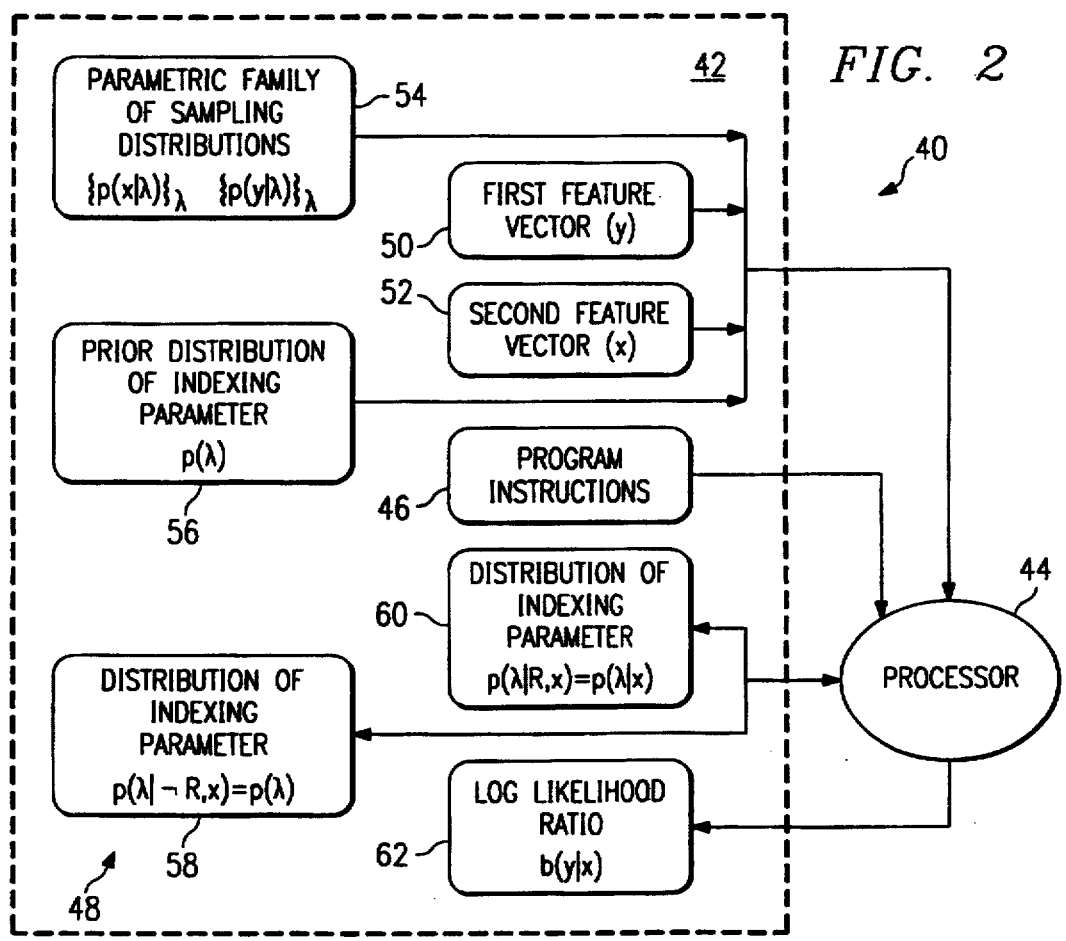

FIG. 5A

| TABLE 1 | | (EXAMPLE 1) |
|---|---|---|
| query (x) | PATENT A | unfiltered count: X = 76 |
| document (y) | PATENT B | unfiltered count: Y = 178 |
| log likelihood ratio | | $b(y|x) = 9.320697$ |
| words in both query and document | | $b++ = 10.255007$ |
| words in neither query nor document | | $b00 = 4.200457$ |
| words in query but not in document | | $b+0 = -3.451278$ |
| words in document but not in query | | $b0+ = -1.683489$ |

FIG. 5B

| TABLE 2 | | | (EXAMPLE 1) |
|---|---|---|---|
| WORDS IN NEITHER PATENT A NOR PATENT B | $b(y_j | x_j)$ | PATENT A $x_j$ | PATENT B $y_j$ |
| image | 0.143417 | 0 | 0 |
| information | 0.142622 | 0 | 0 |
| display | 0.128102 | 0 | 0 |
| memory | 0.116798 | 0 | 0 |
| processing | 0.109595 | 0 | 0 |
| ... | ... | ... | ... |
| | | $b00 =$ | 4.200457 |

FIG. 5C

| TABLE 3 | | | | | (EXAMPLE 1) |
|---|---|---|---|---|---|
| WORDS IN BOTH PATENT A AND PATENT B | omega_j | Omega_j | x_j | y_j | b(y_j \| x_j) |
| network | 0.284151 | 192.343 | 1 | 8 | 1.412086 |
| propagation | 0.120824 | 2963.118 | 1 | 1 | 2.146830 |
| training | 0.143775 | 726.517 | 1 | 3 | 2.645271 |
| back | 0.190321 | 1094.567 | 1 | 1 | 1.635442 |
| neural | 0.157284 | 498.141 | 1 | 3 | 2.415378 |
| | | | | b++ = | 10.255007 |

FIG. 5E

| TABLE 5 | | | | (EXAMPLE 1) |
|---|---|---|---|---|
| WORDS IN PATENT B BUT NOT IN PATENT A | omega_j | Omega_j | y_j | b(y_j \| x_j) |
| binary | 0.196796 | 480.802 | 6 | -0.647673 |
| serially | 0.122712 | 3601.459 | 1 | -0.019790 |
| computer | 0.549474 | 172.517 | 2 | -0.299750 |
| range | 0.220780 | 518.447 | 1 | -0.096237 |
| adjusted | 0.148847 | 1418.930 | 1 | -0.045648 |
| programmed | 0.204611 | 1159.311 | 1 | -0.053592 |
| artificial | 0.137596 | 2434.301 | 2 | -0.057072 |
| algorithm | 0.214637 | 685.385 | 1 | -0.079902 |
| interconnected | 0.180830 | 1703.955 | 1 | -0.038858 |
| multiplicity | 0.136709 | 2657.629 | 1 | -0.026210 |
| layers | 0.118825 | 1923.164 | 1 | -0.035148 |
| feedback | 0.156501 | 1492.292 | 3 | -0.132678 |
| layer | 0.119517 | 866.065 | 2 | -0.138875 |
| accelerating | 0.086060 | 14148.368 | 1 | -0.005285 |
| iterated | 0.097764 | 10989.793 | 1 | -0.006772 |
| | | | b0+ = | -1.683489 |

| TABLE 4 | | | | (EXAMPLE 1) |
|---|---|---|---|---|
| WORDS IN PATENT A BUT NOT IN PATENT B | omega_j | Omega_j | x_j | b(y_j \| x_j) |
| sequence | 0.284691 | 327.797 | 1 | −0.345699 |
| order | 0.412928 | 478.828 | 1 | −0.262633 |
| well | 0.293938 | 878.148 | 1 | −0.167081 |
| space | 0.245516 | 353.132 | 1 | −0.331959 |
| partial | 0.168070 | 703.205 | 2 | −0.408142 |
| connection | 0.176113 | 842.689 | 1 | −0.174544 |
| weights | 0.136598 | 1667.375 | 3 | −0.291079 |
| weight | 0.145119 | 616.638 | 1 | −0.225107 |
| derived | 0.234681 | 904.079 | 1 | −0.163872 |
| procedure | 0.193771 | 514.666 | 1 | −0.256890 |
| optimization | 0.147680 | 1730.401 | 2 | −0.187381 |
| constrained | 0.101205 | 2964.603 | 1 | −0.056748 |
| networks | 0.175390 | 1112.348 | 2 | −0.277601 |
| iterative | 0.147618 | 2658.445 | 1 | −0.062807 |
| solution | 0.131700 | 1218.367 | 1 | −0.127860 |
| squares | 0.123781 | 4254.257 | 1 | −0.040196 |
| decomposition | 0.110963 | 5146.599 | 1 | −0.033461 |
| accelerated | 0.101085 | 19602.100 | 1 | −0.009001 |
| optimizations | 0.105555 | 37522.644 | 1 | −0.004722 |
| supervised | 0.092328 | 11601.975 | 1 | −0.015118 |
| back-propagation | 0.079302 | 18813.409 | 1 | −0.009376 | b+0 = −3.451278

*FIG. 5D*

| TABLE 8 | | | | | (EXAMPLE 2) |
|---|---|---|---|---|---|
| WORDS IN BOTH PATENT A AND PATENT C | omega_j | Omega_j | x_j | y_j | b(y_j \| x_j) |
| network | 0.284151 | 192.343 | 1 | 2 | 1.344093 | b++ = 1.344093

| TABLE 6 | | (EXAMPLE 2) |
|---|---|---|
| query (x) | PATENT A | unfiltered count: X = 76 |
| document (y) | PATENT C | unfiltered count: Y = 91 |
| log likelihood ratio | | b(y\|x) = -2.096464 |
| words in both query and document | | b++ = 1.344093 |
| words in neither query nor document | | b00 = 2.344395 |
| words in query but not in document | | b+0 = -2.203413 |
| words in document but not in query | | b0+ = -3.581540 |

FIG. 5G

| TABLE 7 | | | (EXAMPLE 2) |
|---|---|---|---|
| WORDS IN NEITHER PATENT A NOR PATENT B | $b(y\_j \mid x\_j)$ | PATENT A $x\_j$ | PATENT C $y\_j$ |
| display | 0.089618 | 0 | 0 |
| image | 0.103004 | 0 | 0 |
| memory | 0.080228 | 0 | 0 |
| computer | 0.061326 | 0 | 0 |
| control | 0.059905 | 0 | 0 |
| character | 0.048767 | 0 | 0 |
| processor | 0.037447 | 0 | 0 |
| stored | 0.032573 | 0 | 0 |
| process | 0.031972 | 0 | 0 |
| ... | ... | ... | ... |
| | | | b00 = 2.344395 |

FIG. 5I

| TABLE 9 | | | | (EXAMPLE 2) |
|---|---|---|---|---|
| WORDS IN PATENT A BUT NOT IN PATENT C | omega_j | Omega_j | x_j | b(y_j \| x_j) |
| sequence | 0.284691 | 327.797 | 1 | −0.191348 |
| order | 0.412928 | 478.828 | 1 | −0.142742 |
| well | 0.293938 | 878.148 | 1 | −0.088888 |
| space | 0.245516 | 353.132 | 1 | −0.183243 |
| propagation | 0.120824 | 2963.118 | 1 | −0.029413 |
| partial | 0.168070 | 703.205 | 2 | −0.219020 |
| connection | 0.176113 | 842.689 | 1 | −0.093024 |
| weights | 0.136598 | 1667.375 | 3 | −0.152334 |
| weight | 0.145119 | 616.638 | 1 | −0.121377 |
| training | 0.143775 | 726.517 | 1 | −0.105889 |
| derived | 0.234681 | 904.079 | 1 | −0.087118 |
| procedure | 0.193771 | 514.666 | 1 | −0.139506 |
| optimization | 0.147680 | 1730.401 | 2 | −0.097986 |
| back | 0.190321 | 1094.567 | 1 | −0.073916 |
| constrained | 0.101205 | 2964.603 | 1 | −0.029414 |
| networks | 0.175390 | 1112.348 | 2 | −0.146723 |
| iterative | 0.141618 | 2658.445 | 1 | −0.032602 |
| solution | 0.131700 | 1218.367 | 1 | −0.067405 |
| squares | 0.123781 | 4254.257 | 1 | −0.020752 |
| neural | 0.157284 | 498.141 | 1 | −0.143875 |
| decomposition | 0.110963 | 5146.599 | 1 | −0.017246 |
| accelerated | 0.101085 | 19602.100 | 1 | −0.004612 |
| optimizations | 0.105555 | 37522.644 | 1 | −0.002417 |
| supervised | 0.092328 | 11601.975 | 1 | −0.007758 |
| back-propagation | 0.079302 | 18813.409 | 1 | −0.004804 |
| | | | b+0 = | −2.203413 |

FIG. 5J

| TABLE 10 | | | | (EXAMPLE 2) |
|---|---|---|---|---|
| WORDS IN PATENT C BUT NOT IN PATENT A | omega_j | Omega_j | y_j | b(y_j \| x_j) |
| area | 0.288752 | 236.240 | 1 | −0.188601 |
| information | 0.516726 | 115.257 | 2 | −0.527787 |
| extracted | 0.194164 | 1051.922 | 1 | −0.063334 |
| level | 0.243344 | 368.559 | 1 | −0.144663 |
| node | 0.177286 | 224.788 | 2 | −0.417897 |
| nodes | 0.184396 | 346.267 | 1 | −0.153213 |
| processing | 0.625939 | 167.662 | 1 | −0.184844 |
| format | 0.220716 | 450.273 | 1 | −0.125963 |
| session | 0.120657 | 1086.725 | 4 | −0.249527 |
| program | 0.345608 | 153.917 | 2 | −0.495237 |
| monitors | 0.155745 | 2019.534 | 1 | −0.035133 |
| distributed | 0.213691 | 651.974 | 1 | −0.094641 |
| statistical | 0.168371 | 1302.250 | 1 | −0.052505 |
| transmitted | 0.234869 | 749.819 | 1 | −0.084183 |
| monitoring | 0.207898 | 832.740 | 1 | −0.077345 |
| passing | 0.152930 | 2059.237 | 1 | −0.034504 |
| software | 0.230393 | 360.355 | 2 | −0.303004 |
| packet | 0.122760 | 928.601 | 2 | −0.142952 |
| packets | 0.121001 | 1312.816 | 1 | −0.052294 |
| identifies | 0.193140 | 1458.438 | 1 | −0.047322 |
| realtime | 0.123505 | 13839.093 | 1 | −0.005437 |
| collecting | 0.132601 | 3325.972 | 1 | −0.021919 |
| accumulates | 0.093744 | 11129.748 | 1 | −0.006745 |
| extracts | 0.140896 | 4106.702 | 1 | −0.017888 |
| headers | 0.094771 | 8799.297 | 2 | −0.017016 |
| sessions | 0.100695 | 3910.425 | 2 | −0.037587 | b0+ = −3.581540

PROCESS AND SYSTEM FOR DETERMINING RELEVANCE

TECHNICAL FIELD OF THE INVENTION

This invention relates in general to the field of electronic systems, more particularly to a process and system for determining relevance, and in particular for determining relevance between two documents.

BACKGROUND OF THE INVENTION

In electronic systems for processing data including text, image, audio and video information, it is often desirable to search a collection of information to determine whether any of the information is relevant to a specified piece of search data. For example, with respect to text information, a collection of textual documents can be searched to determine which of the textual documents is relevant to a textual query. The SHADOW PATENT OFFICE™ (SPO™) patent retrieval system available from ELECTRONIC DATA SYSTEMS, located in Plano, Tex., uses existing text-based retrieval methods applied to patent searches.

In search systems, the textual query can comprise properties of a portion of a textual document that is or is not a member of the collection being searched. Similar searches of documents representing image, audio and video information can be performed. In addition, documents could contain two or more types of information. The relevance between two documents, whether those documents comprise text, image, audio and/or video information, is useful for a number of purposes. One such conventional purpose is document retrieval.

Conventional processes and systems for determining relevance between two documents suffer from a number of problems and disadvantages. One problem is that conventional systems are limited with respect to the accuracy with which relevance is determined. Assumptions and approximations are made in order to produce answers at the expense of accuracy. This approach results, for example, in documents being retrieved as relevant to a query where those documents are, in reality, relatively unrelated. Conversely, for example, documents are not retrieved that are related.

Conventional methods for assessing relevance between documents suffer from additional disadvantages. For example, some such methods require human indexing of documents, where the indexing process can be slow, tedious, and inconsistent. Ad hoc vector-based methods suffer from a lack of correspondence to any statistical model that properly accounts for the different sources of information that contribute to accurate assessment of the relevance between two documents. Further, existing probabilistic methods for determining relevance depend intrinsically on manual relevance judgments.

It is desirable to have a process and system for determining relevance between two documents, regardless of the type of information represented by those documents, that accurately generates and stores a measure of relevance between the two documents.

SUMMARY OF THE INVENTION

In accordance with the present invention, a process and system for determining relevance, and in particular for determining relevance between two documents, are provided that substantially eliminate or reduce disadvantages and problems associated with previously developed relevance determination processes and systems.

According to one aspect of the present invention, a process is provided for determining relevance using an electronic system. The process includes providing a first feature vector, providing a second feature vector, and providing an indexing parameter. A parametric family of sampling distributions are provided for the first feature vector using the indexing parameter. A parametric family of sampling distributions are also provided for the second feature vector using the indexing parameter. The process further includes providing a prior distribution of the indexing parameter. A distribution of the indexing parameter, given the second feature vector and an event that the first feature vector is not relevant to the second feature vector, is assigned the value of the prior distribution of the indexing parameter. A distribution of the indexing parameter, given the second feature vector and an event that the first feature vector is relevant to the second feature vector, is assigned the value of the posterior distribution of the indexing parameter given the second feature vector. A log likelihood ratio that the first feature vector is relevant to the second feature vector is then generated using the two assigned distributions of the indexing parameter. The log likelihood ratio is stored as representing relevance between the first feature vector and the second feature vector.

A technical advantage of the present invention is the assigning of a first distribution of the indexing parameter, given the second feature vector and an event that the first document is not relevant to the second document, the value of the prior distribution of the indexing parameter.

A further technical advantage of the present invention is the assigning of a second distribution of the indexing parameter, given the second feature vector and an event that the first document is relevant to the second document, the value of the posterior distribution of the indexing parameter given the second feature vector.

Another technical advantage of the present invention is the generation and storing of the log likelihood ratio using a parametric family of sampling distributions for a first feature vector associated with the first document and a second feature vector associated with the second document and using a prior distribution for the indexing parameter.

An additional technical advantage of the present invention is that it replaces human indexing of documents with much faster, automatic, and consistent statistically-based indexing.

A further technical advantage of the present invention is that it comprises an appropriate statistical model that properly accounts for the different sources of information that contribute to accurate assessment of the relevance between two documents.

Another technical advantage of the present invention is that it does not require manual relevance feedback to determine an appropriate measure of the relevance between two documents.

BRIEF DESCRIPTION OF THE DRAWINGS

A more complete understanding of the present invention and advantages thereof may be acquired by referring to the following description taken in conjunction with the accompanying drawings in which like reference numbers indicate like features, and wherein:

FIGS. 1A and 1B illustrate one embodiment of a process for determining relevance between two documents according to the teachings of the present invention;

FIG. 2 is a block diagram of one embodiment of a computer system for determining relevance between two documents constructed according to the teachings of the present invention;

FIGS. 5A, 5B, 5C, 5D, 5E, 5F, 5G, 5H, 5I and 5J illustrate tables showing examples of generating relevance between a "query" patent and two other "document" patents according to the teachings of the present invention;

DETAILED DESCRIPTION OF THE INVENTION

Figure 3:
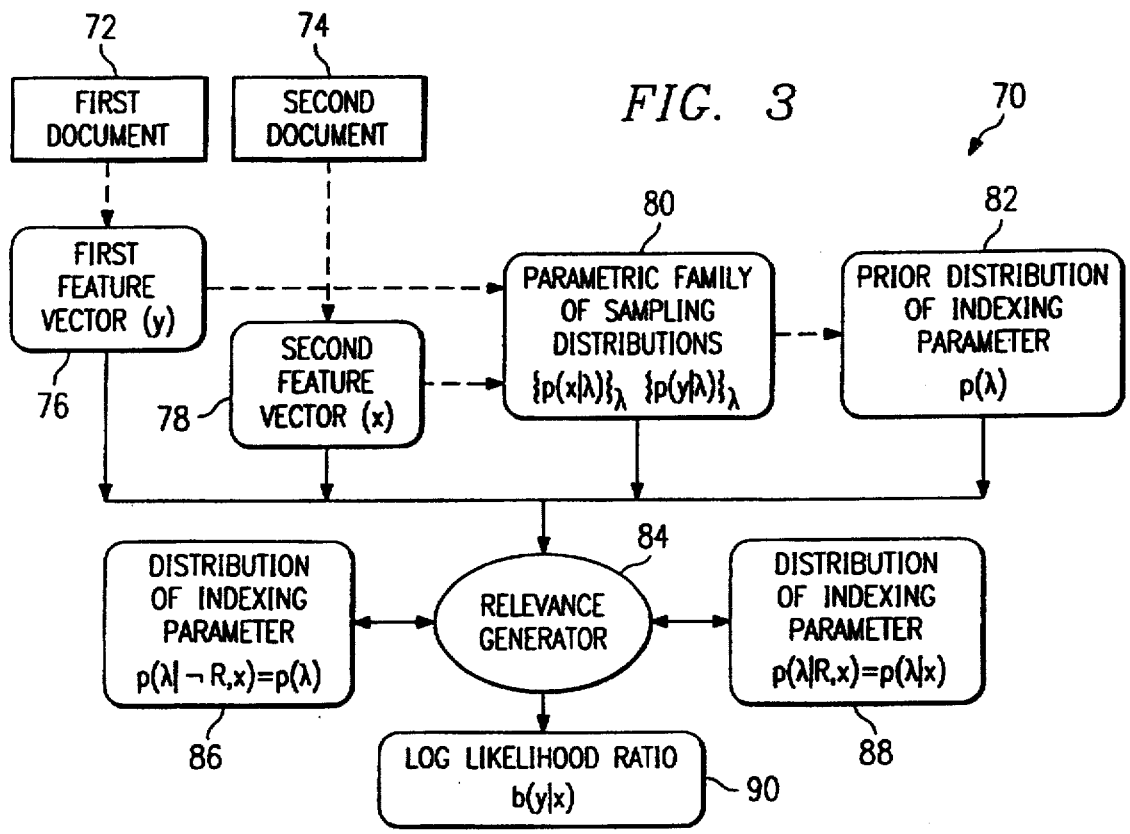
FIG. 3 is a block diagram of one embodiment of a relevance generation system constructed according to the teachings of the present invention.

FIG. 1A illustrates one embodiment of a process for determining relevance between two documents according to the teachings of the present invention. The process of FIG. 1A can be implemented using an electronic system.

In step 10, a feature vector representing a first document is identified and created. Similarly, in step 12, a feature vector for a second document is identified and created. The first and second document comprise data representing text, image, audio or video information or a combination of such information. Each feature vector comprises a property of the document chosen to represent the content of the document. It should be understood that a feature vector could be created without first having a document from which to select features. Generally, it is desired to determine relevance between the first document and the second document, and the feature vectors are used to represent important characteristics of each document. The first feature vector can be referred to as the vector (y) and the second feature vector can be referred to as the vector (x).

In step 14, a parametric family of sampling distributions for each feature vector is determined using an indexing parameter. The indexing parameter can be referred to as $(\lambda)$. thus the parametric families would be $\{p(y|\lambda)\}_\lambda$ with respect to the feature vector (y) and $\{p(x|\lambda)\}_\lambda$ with respect to the feature vector (x). In step 16, a prior distribution of $(\lambda)$ is determined and is referred to as $p(\lambda)$. This prior distribution defines the distribution of the indexing parameter $(\lambda)$ with respect to the second document. In one embodiment of the present invention, the second document is taken from a collection of documents comprising a database of documents. In this embodiment, a feature vector and parametric distribution is defined for each document in the database. In this case, the prior distribution for the indexing parameter $(\lambda)$ represents the distribution of $(\lambda)$ across the entire database of documents.

In step 18, the process sets a distribution of the indexing parameter $(\lambda)$, given the second feature vector (x) and an event $(\neg R)$ that the first document is not relevant to the second document, equal to the prior distribution of the indexing parameter $p(\lambda)$. This process can be represented by the following:

$$p(\lambda|\neg R,x) = p(\lambda)$$

In step 20, the process sets a distribution of the indexing parameter $(\lambda)$, given the second feature vector (x) and an event (R) that the first document is relevant to the second document, equal to the posterior distribution of the indexing parameter $p(\lambda)$ given the second feature vector (x). This process can be represented by the following:

$$p(\lambda|R,x) = p(\lambda|x) = \frac{p(x|\lambda)p(\lambda)}{\int p(x|\lambda)p(\lambda)d\lambda}$$

A technical advantage of the present invention is this assigning of a first distribution of the indexing parameter, given the second feature vector and an event that the first document is not relevant to the second document, the value of the prior distribution of the indexing parameter.

Another technical advantage of the present invention is the assigning of a second distribution of the indexing parameter, given the second feature vector and an event that the first document is relevant to the second document, the value of a distribution of the indexing parameter given the second feature vector.

The system generates a log likelihood ratio that the first document is relevant to the second document in step 22 using the distributions set in step 18 and in step 20. The log likelihood ratio can be represented by the following:

$$b(y|x) = \log\left[\frac{p(y|R,x)}{p(y|\neg R,x)}\right]$$

where the numerator and denominator can be represented as follows:

$$p(y|R,x) = \int p(y|\lambda)p(\lambda|R,x)d\lambda$$

$$p(y|\neg R,x) = \int p(y|\lambda)p(\lambda|\neg R,x)d\lambda$$

In step 24, the system stores the log likelihood ratio, as determined according to the above process, as representing a relevance between the first document and the second document.

FIG. 1B illustrates one embodiment of a process for generating a prior distribution for an indexing parameter given training vectors according to the teachings of the present invention. Instead of directly providing a distribution $p(\lambda)$ for the indexing parameter $\lambda$, it is often more efficient to generate an estimate of $p(\lambda)$ from a set of training vectors (z). Thus, in step 26, a set of training vectors (z) are identified and created. Then, in step 28, a class of prior distributions $\{p(\lambda|\theta)\}_\theta$ with hyperparameter $\theta$ are determined. In step 30, a set of distributions $\{p(z|\theta)\}_\theta$, indexed by $\theta$, for the training vectors (z) are determined. A hyperprior distribution $p(\theta)$ of the hyperparameter $\theta$ is determined in step 32. In step 34, a distribution of the indexing parameter $(\lambda)$ given the training vectors (z) is generated. In step 34, the distribution of the indexing parameter $(\lambda)$ given the vector (z) can be represented as follows:

$$p(\lambda|z) = \int p(\lambda|\theta)p(\theta|z)d\theta$$

$$\text{where, } p(\theta|z) = \frac{p(z|\theta)p(\theta)}{\int p(z|\theta)p(\theta)d\theta}$$

The prior distribution $p(\lambda)$, determined in step 16 of FIG. 1A, can then be replaced by the training set posterior $p(\lambda|z)$ in the above settings for $p(\lambda|R, x)$ and $p(\lambda|\neg R,x)$ in steps 18 and 20.

A technical advantage of the present invention is the generation and storing of the log likelihood ratio using a parametric family of sampling distributions for a first feature vector associated with the first document and a second feature vector associated with the second document and using a prior distribution for the indexing parameter.

An additional technical advantage of the present invention is that it replaces human indexing of documents with much faster, automatic, and consistent statistically-based indexing.

A further technical advantage of the present invention is that it comprises an appropriate statistical model that properly accounts for the different sources of information that contribute to accurate assessment of the relevance between two documents.

Another technical advantage of the present invention is that it does not require manual relevance feedback to determine an appropriate measure of the relevance between two documents.

FIG. 2 is a block diagram of one embodiment of a computer system, indicated generally at 40, having a memory 42 and a processor 44 for determining relevance between two documents according to the teachings of the present invention. In computer system 40, processor 44 is coupled to memory 42 and is operable to access program instructions 46 and program data, indicated generally at 48. Processor 44 performs a process under the control of program instructions 46.

A first feature vector 50 and a second feature vector 52 are stored in memory 42 and are associated with a first document and a second document, respectively. A parametric family of distributions 54 and a prior distribution 56 are also stored in memory 42.

Under control of program instructions 46, processor 44 accesses first feature vector 50, second feature vector 52, parametric family 54 and prior distribution 56. Processor 44 then sets a first distribution of the indexing parameter 58 and a second distribution of the indexing parameter 60, as shown and as set forth above. Processor 44 generates a log likelihood ratio 62 and stores log likelihood ratio 62 in memory 42 as representing a relevance between the first document and the second document. Processor 44 operates under the control of program instructions 46 to generate log likelihood ratio 62 according to the representation described above and uses first distribution 58 and second distribution 60.

FIG. 3 is a block diagram of one embodiment of a relevance generation system, indicated generally at 70, for determining relevance between two documents according to the teachings of the present invention. System 70 can comprise an electronic hardware or hardware/software implementation.

System 70 includes a first document 72 and a second document 74. As described above, first document 72 and second document 74 comprise text, image, audio or video information or a combination of such information. A first feature vector 76 and a second feature vector 78 are identified and created from first document 72 and second document 74, respectively. A parametric family of distributions 80 are determined as well as a prior distribution 82.

First feature vector 76, second feature vector 78, parametric family 80 and prior distribution 82 are accessed by a relevance generator 84. Relevance generator 84 is operable to set a first distribution of the indexing parameter 86 and to set a second distribution of the indexing parameter 88, as shown and as set forth above.

Relevance generator 84 is then operable to generate and store a log likelihood ratio 90. Relevance generator 84 generates log likelihood ratio 90 according to the representation described above and uses first distribution 86 and second distribution 88.

As an example of an implementation of the present invention, the first document can be a document taken from a database of documents holding text information. The second document can be a query to be compared to the first document.

To do this, a set can be used having J content words indexed by j=1, . . . , J. These words would likely include nouns and verbs but not function words like prepositions and helping verbs. Other common words might be eliminated as well.

Let $x_j$ be the number of times that word j occurs in the query, and let X be the number of unfiltered words in the query (note that $\Sigma_j X_j \leq X$). Let $y_j$ be the number of times that word j occurs in the document, and let Y be the number of unfiltered words in the document. Let $x=(x_1, \ldots, x_J)$ 'be the vector of query word counts, and let $y=(y_1, \ldots, y_J)$' be the vector of document word counts. It is assumed in the following discussion that the unfiltered word counts X and Y are fixed.

Let P be the event that the document is relevant to the query, and let $\neg R$ be the complement of R. The log likelihood ratio is:

$$b(y|x) = \log\left[\frac{p(y|R,x)}{p(y|\neg R,x)}\right]$$

This log likelihood ratio can be used to measure the relevance between the query x and the document y.

To calculate this log likelihood ratio, the two likelihoods $p(y|R, x)$ and $p(y|\neg R,x)$ need to be determined. To do this, it can be assumed in either case (i.e., given either R or $\neg R$), that $y_1 \ldots y_J$ are independent and that conditional on the underlying rate parameter $\lambda^y_j$ for word j in document y, the observed word count $y_j$ is an observation from a Poisson process with mean $\lambda^y_j Y$. That is, $$y_j | \lambda^y_j \sim \text{Pois}(\lambda^y_j Y),$$

independently for j=1, . . . , J, where the notation $w \sim \text{Pois}(\alpha)$, indicates that the probability distribution for a random variable w is $$p(w) = \frac{\alpha^w \exp(-\alpha)}{w!},$$

for w=0, 1, 2, . . . .

If $\neg R$ is true (that is, the document is not relevant), then it is determined, according to the teachings of the present invention, that $\lambda^y_j$ is randomly drawn from an underlying gamma distribution with parameters $\omega_j$ and $1/\Omega_j$; that is $$\lambda^y_j | x \sim \text{Gam}(\omega_j, 1/\Omega_j),$$

where the notation $w \sim \text{Gam}(\alpha, \beta)$ indicates that the probability density for a random variable w is $$p(w) = \frac{w^{\alpha-1}\exp(-w/\beta)}{\Gamma(\alpha)\beta^\alpha},$$

for $0 \leq w < \infty$. This distribution for $\lambda^y_j$ assumes that, given $\neg R$, the word rates $\lambda^y_j$ and $\lambda^x_j$ are independent of each other.

Consequently, given $\neg R$ and $x_j$, the document word count $y_j$ has a negative binomial distribution $$y_j | \neg R, x_j \sim \text{NB}\{\omega_j, Y/(\Omega_j+Y)\},$$

where the notation $w \sim NB(\alpha, \beta)$ indicates that a random variable w has probability distribution $$p(w) = \frac{\Gamma(w+\alpha)}{w!\Gamma(\alpha)} \beta^w (1-\beta)^\alpha,$$

for w=0, 1, 2, . . . .

On the other hand, if R is true (i.e., the document is relevant), then it is determined, according to the teachings of the present invention, that $\lambda^y_j$ is randomly drawn from an updated gamma distribution $$\lambda^y_j | R, x_j \sim Gam\{\omega_j + x_j, 1/(\Omega_j + X)\}.$$

This distribution for $\lambda^y_j$ assumes that, given R, the word rate $\lambda^y_j = \lambda^x_j$. It uses the query data $(x_j, X)$ to update the prior distribution for $\lambda^x_j$, thus obtaining a posterior distribution for $\lambda^x_j$. Because x and y are relevant, this posterior distribution for $\lambda^x_j$ is an appropriate prior distribution for $\lambda^y_j$. It follows that $$y_j | R, x_j \sim NB\{\omega_j + x_j, Y/(\Omega_j + X + Y)\}.$$

As a result of these assumptions, the log likelihood ratio is $$b(y|x) = \sum_{j=1}^{J} b(y_j|x_j) =$$

$$\sum_{j=1}^{J} f(y_j; \omega_j + x_j, Y/(\Omega_j + X + Y)) - f(y_j; \omega_j, Y/(\Omega_j + Y))$$

where the function f (·) is defined to be $$f(w; \alpha, \beta) = \log\Gamma(\alpha+w) - \log\Gamma(\alpha) - \log\Gamma(w+1) + w\log(\beta) + \alpha\log(1-\beta),$$

the log probability for a negative binomial random variable.

Note that the processing for a given query involves a term for each word, not just those in the query, or those in the query or the document. Consequently, this method is more computationally intensive than conventional inverted file methods.

The log likelihood ratio for document (y, Y) given the query (x, X) is the same if the two roles are reversed, that is, if (x, X) is treated as the document and (y, Y) is treated as the query. This property is intuitively appealing: it seems reasonable that the query should be as relevant to the document as the document is to the query.

In the above discussion, it can be assumed that the hyperparameters $\theta_j = (\omega_j, \Omega_j)$, j=1, . . . , J, are known. In practice, an empirical Bayesian process can be applied to a training set to estimate the $\theta_j$'s.

In particular, for each j=1, . . . , J, to estimate $\theta_j = (\omega_j, \Omega_j)$, assume the availability of training data $\{(z^1_j, Z^1), \ldots, (z^k_j, Z^k)\}$, where $z^i_j$ is the number of times word j occurs in the $Z^i$ unfiltered words of training document i. Let $z_j = (z^1_j, \ldots, z^k_j)'$. The $Z^i$'s are assumed fixed throughout the following discussion.

Given true rates $\lambda^1_j, \ldots, \lambda^k_j$, the elements of $z_j$ are assumed to independent Poisson variables. That is, $$z^i_j | \lambda^i_j \sim Pois(\lambda^i_j Z^i)$$

independently for i=1, . . . , k.

The true rates $\lambda^1_j, \ldots, \lambda^k_j$ are assumed to be a random sample from a $Gam(\omega_j, 1/\Omega_j)$ distribution. Hence, the marginal distribution of $z_j$ is $$z^i_j | \theta_j \sim NB\{\omega_j, Z^i/(\Omega_j + Z^i)\}$$

independently for i=1, . . . , k.

Furthermore, it is assumed that before observing $z_j$, the hyperparameter $\theta_j$ has a (hyperprior) distribution $p(\theta_j)$. After observing $z_j$, the hyperparameter $\theta_j$ has distribution $$p(\theta_j|z_j) = \frac{p(z_j|\theta_j)p(\theta_j)}{p(z_j)}.$$

If k is reasonably large then $p(\theta_j, z_j) \approx \delta_{\hat{\theta}_j}(\theta_j)$, where $\hat{\theta}_j$ is the maximum likelihood estimate for $\theta_j$ based on $z_j$. That is, it is suitable to assume that $\theta_j$ is known. An algorithm for estimating $\theta_j$ is described in Hill and Tsai, *Calculating the Efficiency of Maximum Quasilikelihood Estimation*, The Journal of the Royal Statistical Society Series C (Applied Statistics), Vol. 37, No. 2, pages 219–230 (1988), the disclosure of which is incorporated herein by reference.

Consequently, the rate parameter $\lambda_j$ has posterior distribution as follows:

$$p(\lambda_j|z_j) = \int p(\lambda_j|\omega_j, \Omega_j)p(\omega_j, \Omega_j|z_j)d\omega_j d\Omega_j,$$

where $$\lambda_j|\omega_j, \Omega_j \sim Gam(\omega_j, 1/\Omega_j)$$

and $p(\omega_j, \Omega_j|z_j)$ is the posterior distribution for $\theta_j$ given the training data $z_j$.

If k is reasonably large, then it can be assumed that $$\lambda_j|z_j \sim Gam(\hat{\omega}_j, 1/\hat{\Omega}_j).$$

This distribution replaces $p(\lambda_j)$ in the earlier described processes and systems.

Figure 4:
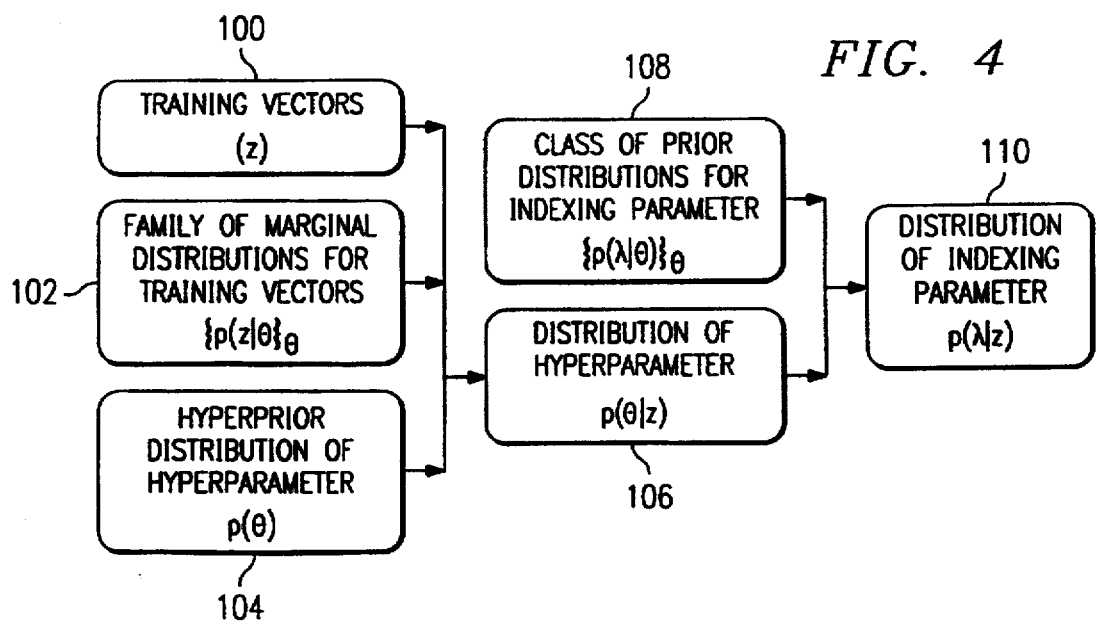
FIG. 4 is a block diagram of a system for generating a prior distribution for an indexing parameter given training vectors according to the teachings of the present invention.

FIG. 4 is a block diagram of a system for generating a prior distribution for an indexing parameter given training vectors according to the teachings of the present invention. As shown, training vectors 100, distributions 102 for training vectors given a hyperparameter, and hyperprior distribution 104 are used to determine distribution 106 of the hyperparameter given the training vectors. Distribution 106 and a class of prior distributions 108 for the indexing parameter are then used to generate a distribution 110 of the indexing parameter given the training vectors. The prior distribution 110 can be provided as prior distribution 56 of FIG. 2 or as prior distribution 82 of FIG. 3. The use of the distribution 110 can be more efficient in certain implementations.

FIGS. 5A, 5B, 5C, 5D, 5E, 5F, 5G, 5H, 5I and 5J illustrate tables showing examples of generating relevance between a "query" patent and two other "document" patents according to the teachings of the present invention. The examples comprise relevance determined where the document and the query are each a U.S. Patent.

FIGS. 5A through 5E illustrate tables showing the relevance generation for a "query" patent (Patent A: U.S. Pat. No. 5,228,113—Accelerated training apparatus for back propagation networks), and a "document" patent (Example 1, Patent B: U.S. Pat. No. 4,912,652—Fast neural network training). Similarly, FIGS. 5F through 5J illustrate tables showing the relevance generation for the "query" patent (Patent A) and a second "document" patent (Example 2, Patent C: U.S. Pat. No. 5,101,402—Apparatus and method for realtime monitoring of network sessions in a local area network).

For these examples, the hyperparameters for the word rate distributions were estimated using a collection of 15,446 software-related U.S. Patents. The text for each patent document was the title and abstract for that patent. The word list allows all words except those on a "stop-word" list defined by the U.S. Patent and Trademark Office and except a few other selected words.

FIG. 5A provides Table 1 which summarizes the relevance generation for Patent A and Patent B. FIG. 5A shows that the log likelihood ratio was 9.320697 comprising four components. FIGS. 5B through 5E provide tables showing the contributions by each component and the associated words.

FIG. 5F provides Table 6 which summarizes the relevance generation for Patent A and Patent C. FIG. 5F shows that the log likelihood ratio was—2.096464 comprising four components. FIGS. 5G through 5J provide tables showing the contributions by each component and the associated words.

To illustrate the calculations, consider the word "neural." In these examples, it has hyperparameter $\theta_j=(\omega_j,\Omega_j)=$ (0.157284, 498.141). The word "neural" occurs $x_j=1$ time out of X=76 unfiltered words in the query. It occurs $y_j=3$ times out of Y=178 unfiltered words in the first document.

Figure 6:
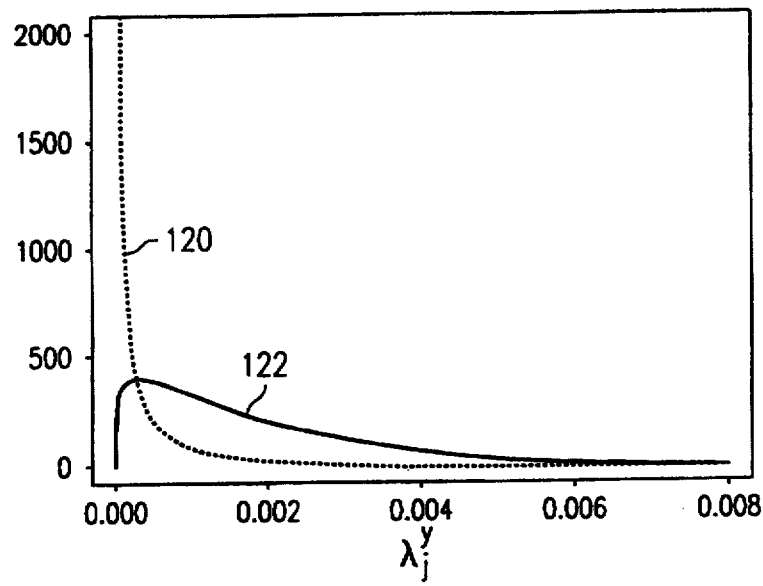
FIG. 6 illustrates a plot of the prior and posterior distributions of the indexing parameter for one of the words in the examples of FIGS. 5A through 5J.

FIG. 6 illustrates a plot of the prior distribution 120 and the posterior distribution 122 of the indexing parameter for the examples of FIGS. 5A through 5J. FIG. 6 shows the prior distribution 120 and posterior distribution 122 for $\lambda^*_j$ which are, according to the teachings of the present invention, the same as $p(\lambda^*_j|\neg R, x_j)$ and $p(\lambda^*_j|R, x_j)$, respectively. In this example, the prior distribution 120 is a Gam(0.157284, 1/498.141) distribution, and the posterior distribution 122 is a Gam(0.157284+1, 1/(498.141+76)) distribution.

Figure 7:
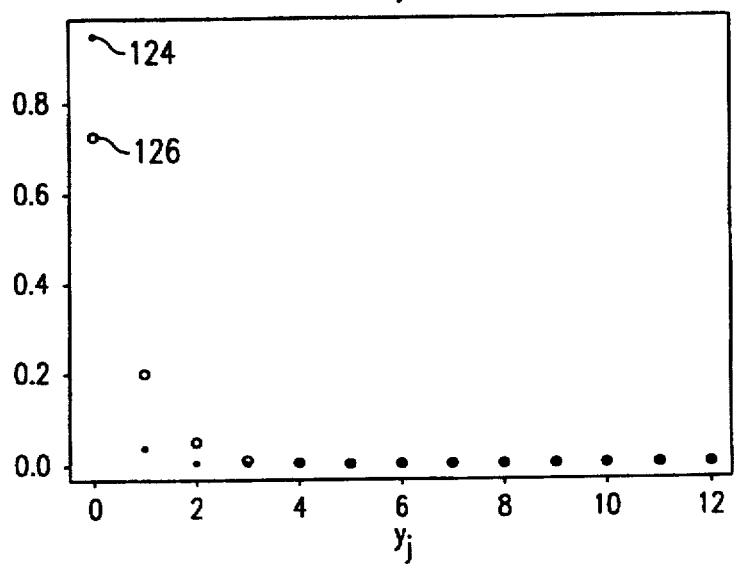
FIG. 7 illustrates plots of one set of negative binomial probability functions for one of the words in the example of FIGS. 5A through 5E.

FIG. 7 illustrates plots of one set of negative binomial probability functions for the example of FIGS. 5A through 5E. Thus, FIG. 7 shows the negative binomial probability functions 124 and 123 for $y_j$ for the two events ($\neg R$) and (R).

Figure 8:
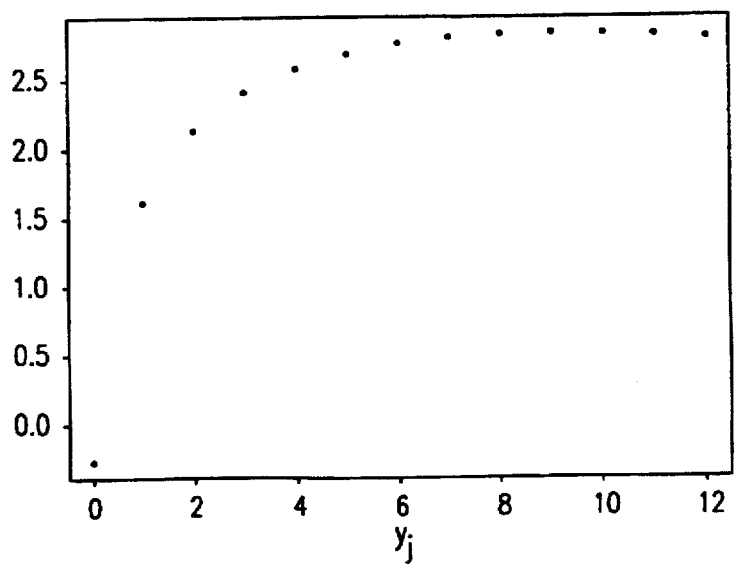
FIG. 8 illustrates a plot of a log likelihood ratio for one of the words in the example of FIGS. 5A through 5E.

FIG. 8 illustrates a plot of a log likelihood ratio for the example of FIGS. 5A through 5E. Thus, FIG. 8 shows a plot of $b(y_j|x_j=1)$ versus $y_j$. The contribution of the word "neural" to the log likelihood ration b(y|x) is given by the following:

$$b(y_j|x_j)=f(3; 0.157284+1,178/(498.141+76+178))-f(3; 0.157284, 178/(498.141+178))$$

$$b(y_j|x_j)=(-4.363065)-(-6.778443)=2.415378$$

This value can be read off the plot illustrated in FIG. 8. This value is also in the right-hand column of the last row of Table 3 shown in FIG. 5C.

It should be understood that the examples and embodiments provided and described above are presented for purposes of describing the present invention and are not intended nor should be construed to limit the scope of the present invention.

The technical advantages of the present invention provide benefits to a process or system for determining the relevance between two documents. The present invention applies whether the documents hold text, image, audio or video information or a combination of such information.

Although the present invention has been described in detail, it should be understood that various changes, substitutions and alterations can be made hereto without departing from the spirit and scope of the invention as defined by the appended claims.

What is claimed is:

1. A process for determining relevance between two documents implemented using an electronic system, the process comprising:

providing a first feature vector representing a first document;

providing a second feature vector representing a second document;

providing an indexing parameter;

providing a parametric family of sampling distributions for the first feature vector using the indexing parameter;

providing a parametric family of sampling distributions for the second feature vector using the indexing parameter;

providing a prior distribution of the indexing parameter;

assigning a distribution of the indexing parameter, given the second feature vector and an event that the first document is not relevant to the second document, the value of the prior distribution of the indexing parameter;

assigning a distribution of the indexing parameter, given the second feature vector and an event that the first document is relevant to the second document, the value of the posterior distribution of the indexing parameter given the second feature vector;

generating a log likelihood ratio that the first document is relevant to the second document using the two assigned distributions of the indexing parameter; and storing the log likelihood ratio as representing relevance between the first document and the second document.

2. The process of claim 1, wherein providing a prior distribution of the indexing parameter comprises generating a posterior distribution of the indexing parameter given a set of training vectors using a hyperparameter.

3. The process of claim 1, wherein providing a first feature vector representing a first document comprises providing a first feature vector representing properties of the first document, the first document representing text information.

4. The process of claim 3, wherein providing a first feature vector representing properties comprises providing a first feature vector representing properties that comprise a frequency of occurrence of selected words with respect to the first document.

5. The process of claim 3, wherein providing a second feature vector representing a second document comprises providing a second feature vector representing properties of the second document, the second document representing text information.

6. The process of claim 5, wherein providing a second feature vector representing properties comprises providing a second feature vector representing properties that comprise a frequency of occurrence of selected words with respect to the second document.

7. The process of claim 1, wherein the process is accomplished using a computer system having a processor and a memory operating under control of program instructions stored in the memory.

8. The process of claim 1, wherein the process is accomplished using an electronic hardware system.

9. A computer system operable to determine relevance between two documents, comprising:

a memory operable to store program instructions and data;

a first feature vector representing a first document, the first feature vector stored in the memory;

a second feature vector representing a second document, the second feature vector stored in the memory;

an indexing parameter, the indexing parameter stored in the memory;

a parametric family of sampling distributions for the first feature vector using the indexing parameter, the parametric family stored in the memory;

a parametric family of sampling distributions for the second feature vector using the indexing parameter, the parametric family stored in the memory;

a prior distribution for the indexing parameter, the prior distribution stored in memory; and a processor coupled to the memory and operable to access the program instructions and data, the processor operable to perform a process under control of the program instructions for:

assigning a distribution of the indexing parameter, given the second feature vector and an event that the first document is not relevant to the second document, the value of the prior distribution for the indexing parameter;

assigning a distribution of the indexing parameter, given the second feature vector and an event that the first document is relevant to the second document, the value of a distribution of the indexing parameter given the second document;

determining a log likelihood ratio that the first document is relevant to the second document using the two assigned distributions of the indexing parameter; and storing the log likelihood ratio in the memory as representing a relevance between the first document and the second document.

10. The computer system of claim 9, wherein the prior distribution for the indexing parameter comprises a posterior distribution of the indexing parameter given a set of training vectors.

11. The computer system of claim 9, wherein the first feature vector representing the first document comprises a first feature vector representing properties of a first document, the first document representing text information.

12. The computer system of claim 11, wherein the properties of the first document comprise a frequency of occurrence of selected words with respect to the first document.

13. The computer system of claim 11, wherein the second feature vector representing the second document comprises a second feature vector representing properties of a second document, the second document representing text information.

14. The computer system of claim 13, wherein the properties of the second document comprise a frequency of occurrence of selected words with respect to the second document.

15. A relevance generation system operable to determine relevance between two documents, comprising:

a first feature vector representing a first document;

a second feature vector representing a second document;

an indexing parameter;

a parametric family of sampling distributions for the first feature vector using the indexing parameter;

a parametric family of sampling distributions for the second feature vector using the indexing parameter;

a prior distribution for the indexing parameter; and a relevance generator operable to access the first feature vector, the second feature vector, the parametric families and the prior distribution, the relevance generator operable to;

assign a distribution of the indexing parameter, given the second feature vector and an event that the first document is not relevant to the second document, the value of the prior distribution for the indexing parameter;

assign a distribution of the indexing parameter, given the second feature vector and an event that the first document is relevant to the second document, the value of a distribution of the indexing parameter given the second document;

generate a log likelihood ratio that the first document is relevant to the second document using the two assigned distributions of the indexing parameter; and store the log likelihood ratio as representing a relevance between the first document and the second document.

16. The relevance generation system of claim 15, wherein the prior distribution for the indexing parameter comprises a posterior distribution of the indexing parameter given a set of training vectors.

17. The relevance generation system of claim 15, wherein the first feature vector representing the first document comprises a first feature vector representing properties of a first document, the first document representing text information.

18. The relevance generation system of claim 17, wherein the properties of the first document comprise a frequency of occurrence of selected words with respect to the first document.

19. The relevance generation system of claim 15, wherein the second feature vector representing the second document comprises a second feature vector representing properties of a second document, the second document representing text information.

20. The relevance generation system of claim 19, wherein the properties of the second document comprise a frequency of occurrence of selected words with respect to the second document.

21. A process for determining relevance implemented using an electronic system, the process comprising:

providing a first feature vector;

providing a second feature vector;

providing an indexing parameter;

providing a parametric family of sampling distributions for the first feature vector using the indexing parameter;

providing a parametric family of sampling distributions for the second feature vector using the indexing parameter;

providing a prior distribution of the indexing parameter;

assigning a distribution of the indexing parameter, given the second feature vector and an event that the first feature vector is not relevant to the second feature vector, the value of the prior distribution of the indexing parameter;

assigning a distribution of the indexing parameter, given the second feature vector and an event that the first feature vector is relevant to the second feature vector, the value of the posterior distribution of the indexing parameter given the second feature vector;

generating a log likelihood ratio that the first feature vector is relevant to the second feature vector using the two assigned distributions of the indexing parameter; and storing the log likelihood ratio as representing relevance between the first feature vector and the second feature vector.

22. The process of claim 21, wherein:

the first feature vector represents a first document; and the second feature vector represents a second document;

such that the log likelihood ratio represents the relevance between the first document and the second document.

* * * * *